Aug. 26, 1969
D. L. COOK ET AL
3,463,361
FLAVORING DEVICE
Filed Jan. 26, 1968
3 Sheets-Sheet 1
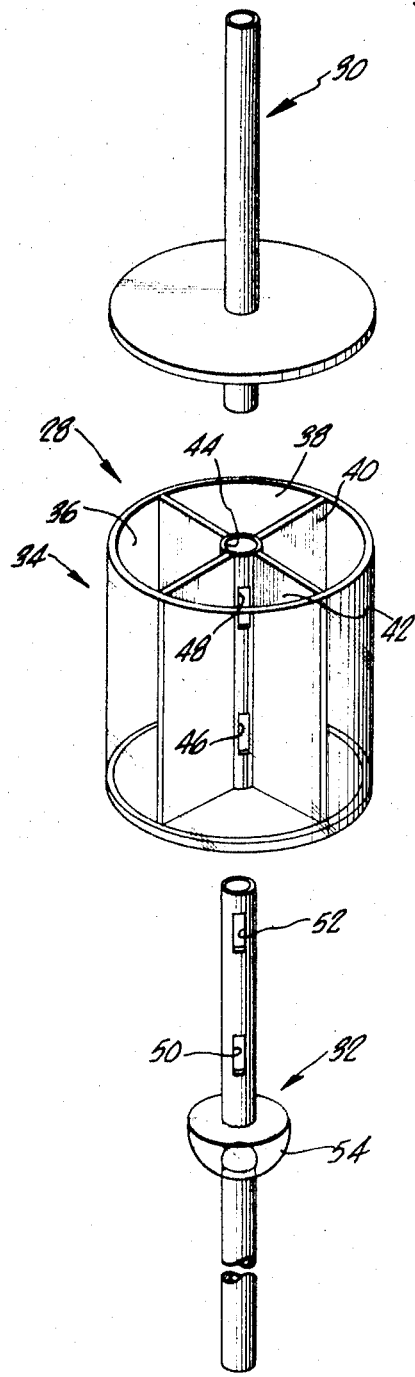
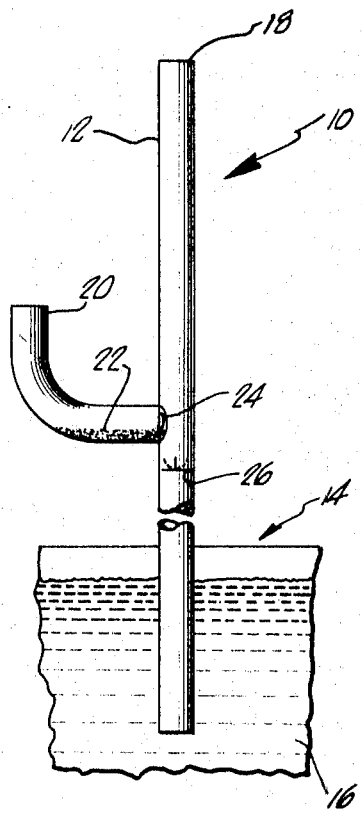
FIG_1
FIG_2
INVENTORS.
DONALD L. COOK
DOUGLAS R. HANSEN
BY RICHARD L. GILLESPIE, SR.
Christie, Parker & Hale
ATTORNEYS.

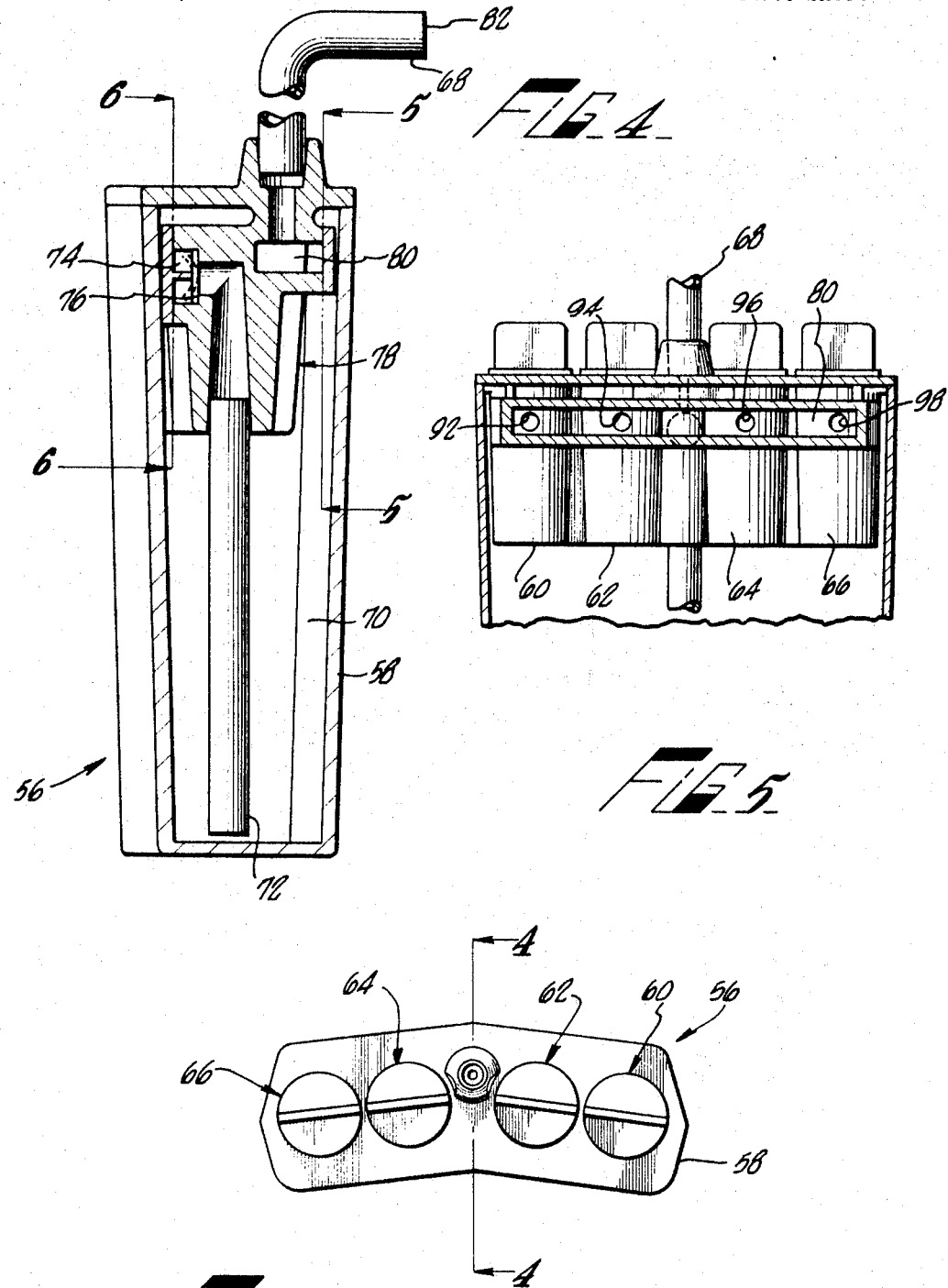

Aug. 26, 1969  D. L. COOK ET AL  3,463,361
FLAVORING DEVICE

Filed Jan. 26, 1968  3 Sheets-Sheet 3

INVENTORS.
DONALD L. COOK
DOUGLAS R. HANSEN
BY RICHARD D. GILLESPIE, SR.

Christie, Parker & Hale
ATTORNEYS.

United States Patent Office 3,463,361
Patented Aug. 26, 1969

3,463,361
FLAVORING DEVICE
Donald L. Cook and Douglas R. Hansen, Santa Monica, and Richard L. Gillespie, Sr., San Gabriel, Calif., assignors to Wham-O Mfg. Co., San Gabriel, Calif., a corporation of California
Filed Jan. 26, 1968, Ser. No. 700,812
Int. Cl. B67d 5/60; A23g 3/00; A47g 21/18
U.S. Cl. 222—144.5                                               10 Claims

ABSTRACT OF THE DISCLOSURE

A self-contained device for adding one or more different flavors to a liquid during intake by the drinker. The device operates on a drinking straw principle and incorporates at least one compartment interposed in the path of liquid through which the liquid to be drunk is circulated. Flavoring material is placed in the compartment to impart a particular taste to the liquid before exit from the device.

Background of the invention

This invention relates to flavoring mechanisms and in particular to a drinking straw having an attached compartment for flavoring materials.

As a convenience and novelty, efforts have been made to devise ways of flavoring liquids without physically adding flavoring material to the liquid prior to consumption. When flavoring is added to a liquid before drinking, there is a certain annoyance factor involved in the effort of adding and stirring the flavoring. In contrast, it has been found that the sensation of consuming liquids with such means as drinking straws and adding flavoring to the liquid as it is being drawn through the straw is a rather stimulating one.

The manner in which this has been accomplished in the past has been to take ordinary drinking straws, such as those fabricated from heavy paper, and impregnate a flavoring material into the material of the straw. Among other limitations of such an approach is the fact that the amount of flavoring available in such a manner is limited and after a small quantity of liquid has been drawn through the straw it must be discarded in favor of a new one. In addition, only one flavor can be imparted to the liquid being consumed, namely, the flavor with which the drinking straw is impregnated.

In contrast, the present invention provides a self-contained device for flavoring liquids in which the flavoring can be turned on and off at will. In its preferred embodiment the invention includes the capability of selecting from a plurality of flavors, any one or a combination of which can be added to the liquid to be consumed. In addition, the flavoring material can be renewed without the necessity of discarding the drinking implement and acquiring a new one.

Summary of the invention

The present invention is a flavoring device comprising a conduit havnig an inlet and an outlet. Attached to the conduit intermediate the inlet and the outlet is a chamber for receiving flavoring material. Means communicating between the flavoring chamber and conduit are provided whereby liquid drawn into the inlet and through the conduit is contacted with the flavoring material prior to exit from the conduit at the outlet.

In one form the present invention contemplates a drinking straw type of structure with a small auxiliary tube or straw attached to the main straw, the interior of the two straws being in liquid communication by means of a small aperture in the wall of the main straw. Before use, flavoring material such as sugar, artificial citrus flavoring, vanilla extract, powdered chocolate and the like is placed in the auxiliary straw. When the main straw is inserted into a receptacle containing liquid to be flavored and the user draws on its outlet end, the aspirator effect of the liquid passing the small aperture interconnecting the two straws has the effect of drawing a metered amount of flavoring material into the liquid to flavor it.

In a preferred embodiment the device of the present invention incorporates the capability of selectively connecting one of several flavoring chambers to the main conduit. In this way the user can rapidly and easily change the flavoring of the liquid to be consumed to increase the novel taste sensation characteristic of the device.

In another embodiment, the invention contemplates a self-contained unit similar to a flask or canteen which includes a receptacle for liquid to be flavored. In use a liquid would be added to the receptacle and the entire device carried with the user until he desires to take a drink. By connecting the flavoring chamber to the liquid path and drawing on the outlet of the conduit the liquid is drawn into and through the flavoring chamber and thence to the user's mouth.

In still another preferred embodiment, a plurality of flavoring chambers are commonly connected to the main liquid conduit so that any one or combination of flavor chambers may be connected to the liquid conduit to provide a selection of flavors which are available to the user. This embodiment further contemplates the provision of valving means intermediate the liquid receptacle and the flavoring chambers to prevent liquid from being returned to the liquid receptacle subsequent to its withdrawal therefrom. In this manner discoloration of the unflavored liquid in the supply receptacle is prevented.

Brief description of the drawings

These and other advantages of the present invention will be better understood by reference to the following figures in which:

FIG. 1 is an elevational view of a drinking straw provided with a flavoring chamber attached thereto;

FIG. 2 is an elevational view of an alternate embodiment of the flavoring device of the present invention;

FIG. 3 is a plan view of a preferred embodiment of the flavoring device of the present invention;

FIG. 4 is a view taken along lines 4—4 of FIG. 3;

FIG. 5 is a sectional, partial elevational view taken along lines 5—5 of FIG. 4;

Figure 6:
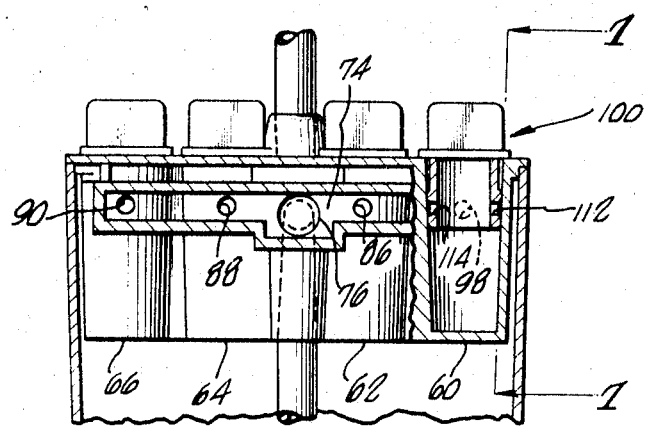
FIG. 6 is a sectional, partial elevational view taken along lines 6—6 of FIG. 4.

A flavoring device 10 according to the present invention is illustrated in FIG. 1. As shown therein a drinking straw 12 serves as a main conduit communicating between a receptacle 14 for liquid 16 to be flavored and the outlet end 18 of the flavoring device. Attached to straw 12 is a chamber comprised of a short auxiliary length of straw or conduit 20 provided with a right angle bend which is adapted to receive flavoring material 22. An aperture 24 communicates between conduit 20 and main conduit 12. Provided below aperture 24 is a flutter valve 26 secured interiorly of conduit 20. When a user draws or sucks on the outlet end 18 of the straw, the flutter valve 26 is caused to flex to its ghosted position to allow liquid to pass from receptacle 14 to end 18. Due to the aspirator effect the flavoring material 22 is drawn through aperture 24 into the liquid stream to flavor it.

Shown in an exploded view in FIG. 2 is an alternate embodiment of the invention. In this embodiment a flavoring device 28 includes an outlet conduit 30, an intake conduit 32 and a flavoring chamber 34. Chamber 34 is divided into four compartments, 36, 38, 40 and 42, respectively, to which four different types of flavoring material can be added. Passing longitudinally through flavoring chamber 34 is a conduit 44 and provided in the walls of conduit 44 are inlet and outlet apertures 46 and 48, respectively. Although not shown, each of the remaining flavoring compartments 36, 38 and 40 are likewise provided with similar pairs of apertures. Intake conduit 32 is provided with inlet and outlet apertures 50 and 52, respectively, and is of a diameter smaller than flavoring conduit 44 to permit insertion therein such that when inserted into conduit 44, apertures 50 and 52 are adapted to mate or register with one of the pairs of apertures communicating wtih each of the flavoring compartments, e.g., apertures 46 and 48. Unidirectional means such as ball valve 54 is provided in conduit 32 below aperture 50 to prevent liquid from returning to a liquid supply receptacle once the liquid has been withdrawn therefrom. Outlet conduit 30, like conduit 32, is of a diameter such that it can be inserted into conduit 44, the combination of the three conduits providing a drinking straw-like apparatus for withdrawing liquid from a supply to a drinker's mouth.

In operation the three component parts of the flavoring device are fitted together and the flavoring chamber 34 is rotated to bring the apertures of the desired flavoring compartment into register with the apertures into conduit 32 to permit liquid communication into and out of the flavoring compartment and prevent communication with the non-selected compartments. The user then draws on outlet conduit 30 causing liquid to be drawn up conduit 32 and through intake apertures 50 and 46, respectively. The liquid circulates briefly in compartment 42 and is withdrawn through outlet apertures 52 and 48, respectively, and thence up intake conduit 30 to the outlet from the flavoring device.

A self-contained flavoring device according to the present invention is illustrated in FIGS. 3, 4, 5, 6, and 7. As shown in the plan view of FIG. 3, a flavoring device 56 is provided which includes a liquid receptacle 58, a plurality of flavoring compartments, 60, 62, 64, and 66. An outlet conduit 68, similar to a drinking straw, extends from the top of receptacle 58 to the outlet from the flavoring device.

In FIG. 4, a sectional view taken along lines 4—4 of FIG. 3, further details of device 56 are illustrated. Liquid receptacle 58 is provided with a sizeable chamber 70 for holding a supply of liquid to be flavored. An intake conduit 72 extends from near the bottom of chamber 70 to an inlet channel 74 which is in liquid communication with conduit 72 through a one way flutter valve 76. As will be discussed in more detail subsequently, inlet channel 74 communicates with inlet apertures to the various flavoring compartments. Flutter valve 76 is located in a housing 78 in which the flavoring chambers are mounted. Valve 76 is provided to prevent liquid withdrawn from chamber 70 from returning due to gravity flow or a siphon effect. An outlet channel 80 communicates with the outlet apertures of the flavoring chambers and thence with outlet conduit 68 to the outlet 82 from the flavoring device.

Figure 7:
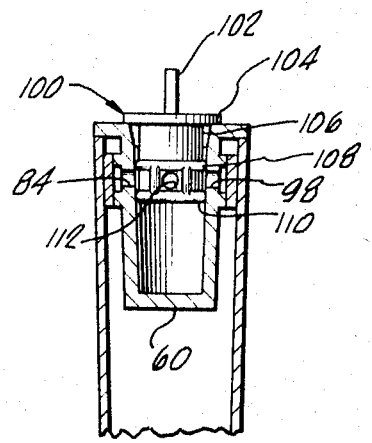
FIG. 7 is a sectional, partial elevational view taken along lines 7—7 of FIG. 6.

As shown in FIGS. 5, 6, and 7, flavoring chambers 60, 62, 64 and 66 are provided with inlet apertures 84, 86, 88 and 90, respectively, and outlet apertures 92, 94, 96 and 98, respectively. In FIGS. 6 and 7, flavoring chamber 60 is illustrated in detail and is representative of the structure of the flavoring chambers of the device. This chamber, as well as the other flavoring chambers, is a small, hollow cylinder or vial adapted to receive flavoring material. Inlet channel 74 is horizontally disposed as shown in FIG. 6 and communicates between valve 76 and the various inlet apertures. Likewise, outlet channel 80 as shown in FIG. 5 is horizontally disposed and communicates with the various outlet apertures and outlet conduit 68.

As shown in these figures, chamber 60 is closed by a cap 100 having a vertical turning tab 102, a horizontally disposed lid 104 and a valving member 106 extending from the side of lid 104 opposite tab 102 into the interior of chamber 60. Valving member 106 is chosen of a diameter such that it is friction fitted within chamber 60 by means of annular rings 108 and 110 which are raised from the surface of the member. Rings 108 and 110 are located on the surface of member 106 so as to bracket a pair of apertures 112 and 114 in member 106. By turning tab 102 through an angle of 90°, apertures 112 and 114 can be alternately brought into and out of communication with inlet and outlet apertures 84 and 98, respectively, to bring the flavoring material in chamber 60 into communication with liquid supplied from receptacle 58.

In operation the flavoring device of the present invention performs as follows: Liquid to be flavored, such as water, is placed in chamber 58 and a flavoring material, e.g., artificial citrus flavoring, is placed in each of the flavoring chambers. The flavoring chambers are then closed by caps, e.g., cap 100, and the turning tabs, e.g. tab 102, on the caps adjusted to bring one or more of the chambers into liquid communication with the inlet and outlet channels of the device. When the desired flavoring has been selected, the user draws on the outlet conduit 68 in the same manner as drawing on a drinking straw and liquid is caused to be drawn up through conduit 72 through valve 76 and channel 74 to fill the channel and thence penetrate into one or more of the flavoring chambers depending upon the setting of the turning tabs. The liquid drawn into the flavoring chambers passes over and circulates through the flavoring material and then is withdrawn through the outlet aperture of the chamber through outlet channel 80 and thence through outlet conduit 68.

The caps for the flavoring chambers can all be positioned out of communication with the supply receptacle when it is desired to carry the device without the danger of spillage. It is contemplated that frequently at least two chambers will be simultaneously connected to the supply liquid to permit the mixing of flavors by the user. The embodiments described above and illustrated in the drawings are representative of the flavoring device of the present invention and include a presently preferred embodiment. Illustration of three embodiments is not intended as limiting and other variations on the structures disclosed will be obvious to those skilled in the art without departure from the scope of the invention.

What is claimed is:
1. A self-contained flavoring device comprising:
a receptacle for liquid to be flavored;
a flavoring chamber having a plurality of flavoring compartments, each compartment having an inlet and an outlet aperture;
an inlet channel in said flavoring chamber communicating with each of said inlet apertures;
an outlet channel in said flavoring chamber communicating with each of said outlet apertures, said outlet channel being sealed against liquid communication with inlet channel;
first conduit means communicating between said liquid receptacle and said inlet channel;
second conduit means communicating between said outlet channel and an outlet from the device;
one way valve means located between the liquid receptacle and the inlet channel to prevent the return of liquid to the receptacle subsequent to withdrawal therefrom; and
valve means in each of said flavoring compartments for selectively connecting said compartments with said inlet and outlet channels.

2. A drinking straw and flavoring apparatus comprising:
 a hollow drinking tube having an open inlet end and open outlet end and at least one aperture in the wall of the tube located intermediate the inlet and outlet ends, the inlet end being adapted to be inserted in a supply of liquid to be flavored, the outlet end being adapted to be inserted in the mouth of a user;
 an auxiliary chamber attached to the tube in communication with the tube aperture, the chamber being adapted to receive and hold material for flavoring liquids until said material is caused to be withdrawn through the aperture when the inlet end is inserted in a supply of liquid and suction applied by user to the outlet end draws liquid through the tube and causes the liquid to be flavored in its passage between the inlet and outlet ends.

3. An apparatus according to claim 2 including unidirectional means located between the inlet end of the apparatus and the tube aperture to prevent the return of liquid to said inlet end subsequent to passage beyond said unidirectional means.

4. A drinking straw and flavoring apparatus according to claim 11 wherein the flavoring chamber is provided with a plurality of compartments, each of the compartments being adapted to receive and hold a different flavoring material and being selectively connectable to the aperture in the tube whereby the flavoring imparted to the liquid in its passage from the inlet to the outlet ends can be selectively changed.

5. An apparatus according to claim 4 including valving means in each of said flavoring chambers for selectively connecting each of said chambers to said tube.

6. An apparatus according to claim 4 wherein said tube passes through the said flavoring chamber and including
 means for movably mounting the flavoring chamber on the drinking tube;
 a second aperture in the drinking tube intermediate the inlet and outlet end spaced from the first aperture; and
 a pair of apertures in each of the flavoring compartments located so as to register with the apertures in the tube whereby when apertures of a selected compartment are moved into registration with the tube apertures, liquid can be drawn by suction applied at the outlet end through the first tube aperture into the flavoring compartment and thereafter through the second tube aperture out of the flavoring compartment to the outlet end.

7. An apparatus according to claim 6 including a liquid receptacle attached to the flavoring device in liquid communication with the inlet end of the apparatus.

8. A self-contained flavoring device operating on a drinking straw principle comprising:
 a receptacle for liquid to be flavored;
 a flavoring chamber attached to the receptacle, the flavoring chamber having an inlet and an outlet aperture;
 first conduit means communicating between said liquid receptacle and said inlet aperture;
 second conduit means communicating between said outlet aperture and an outlet from the device; and
 unidirectional means located between the liquid receptacle and the inlet aperture to prevent the return of liquid to the receptacle subsequent to passage beyond the unidirectional means whereby liquid placed in the receptacle can be drawn by suction at the outlet from the receptacle through the first conduit, the unidirectional means, the inlet aperture, the flavoring chamber, the outlet aperture, and the second conduit to flavor the liquid prior to passage from the outlet end of the device.

9. A device according to claim 8 wherein said flavoring chamber is provided with a plurality of flavoring compartments and including:
 means for selectively connecting at least one of said flavoring compartments between the first and second conduit means for selectively flavoring the liquid drawn from the receptacle to the outlet end of the device.

10. A device according to claim 9 including means for selectively preventing communication between at least one of said compartments and said first and second conduit means.

References Cited

UNITED STATES PATENTS

| | | | |
|---|---|---|---|
| 2,823,833 | 2/1958 | Bauerlein | 222—193 X |
| 2,653,802 | 9/1953 | Bauerlein | 222—193 X |
| 2,785,833 | 3/1957 | Bauerlein et al. | 222—193 X |
| 2,901,357 | 8/1959 | Epstein. | |

ROBERT B. REEVES, Primary Examiner

H. S. LANE, Assistant Examiner

U.S. Cl. X.R.

99—138; 222—193; 239—33

PO-1050
(5/69)

UNITED STATES PATENT OFFICE
CERTIFICATE OF CORRECTION

Patent No. 3,463,361      Dated August 26, 1969

Inventor(s) Donald L. Cook, Douglas R. Hansen and Richard L. Gillespie,

It is certified that error appears in the above-identified patent and that said Letters Patent are hereby corrected as shown below:

Col. 1, line 61, "havnig" should read --having--.

Col. 3, line 18, "wtih" should read --with--.

Col. 4, line 64, after "with" insert --said--.

Col. 5, line 24, "11" should read --2--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents